United States Patent
Elton

[15] 3,640,829
[45] Feb. 8, 1972

[54] MICROPOROUS PRODUCTS

[72] Inventor: Robert L. Elton, White Bear Lake, Minn.
[73] Assignee: Minnesota Mining and Manufacturing Company, St. Paul, Minn.
[22] Filed: Oct. 20, 1969
[21] Appl. No.: 867,538

[52] U.S. Cl..............................161/159, 156/77, 161/164, 161/191, 260/2.5, 264/344
[51] Int. Cl.....................B32b 3/26, C08g 22/44, D06n 3/14
[58] Field of Search.......260/2.5 AC, 2.5 AL, 2.5 AN, 2.5 A, 260/2.5 AY; 156/77–79, 209, 219, 220; 117/62.1, 63, 135.5; 161/151, 159, 160, 164, 191; 264/48, 49, 45, 344

[56] References Cited

UNITED STATES PATENTS 3,244,673  4/1966  Bruin et al. .........................260/2.5 X
3,418,198  12/1968  Einstman................................161/84

Primary Examiner—William A. Powell
Attorney—Kinney, Alexander, Sell, Steldt & Delahunt

[57] ABSTRACT

In the disclosed method of making a microporous sheet material a heat-formed (extruded, calendered, or pressed) film comprising (1) a polyurethane (preferably combined with an epoxidized soybean oil processing aid—a water insoluble plasticizer can also be included) capable of forming a nonporous film having a storage shear modulus (G') of about 0.4 to $5 \times 10^8$ dynes/cm.$^2$ and a loss tangent at 0.2 cycle/sec. less than 0.5, both measured at 23° C., and (2) distributed throughout the film, a plurality of <30 micron salt (e.g. NaCl) particles, is annealed prior to leaching of the salt from the film with an aqueous medium. The resulting microporous film is useful in making leatherlike sheet materials. Preferably, the film is embossed prior to leaching but after annealing.

9 Claims, 2 Drawing Figures

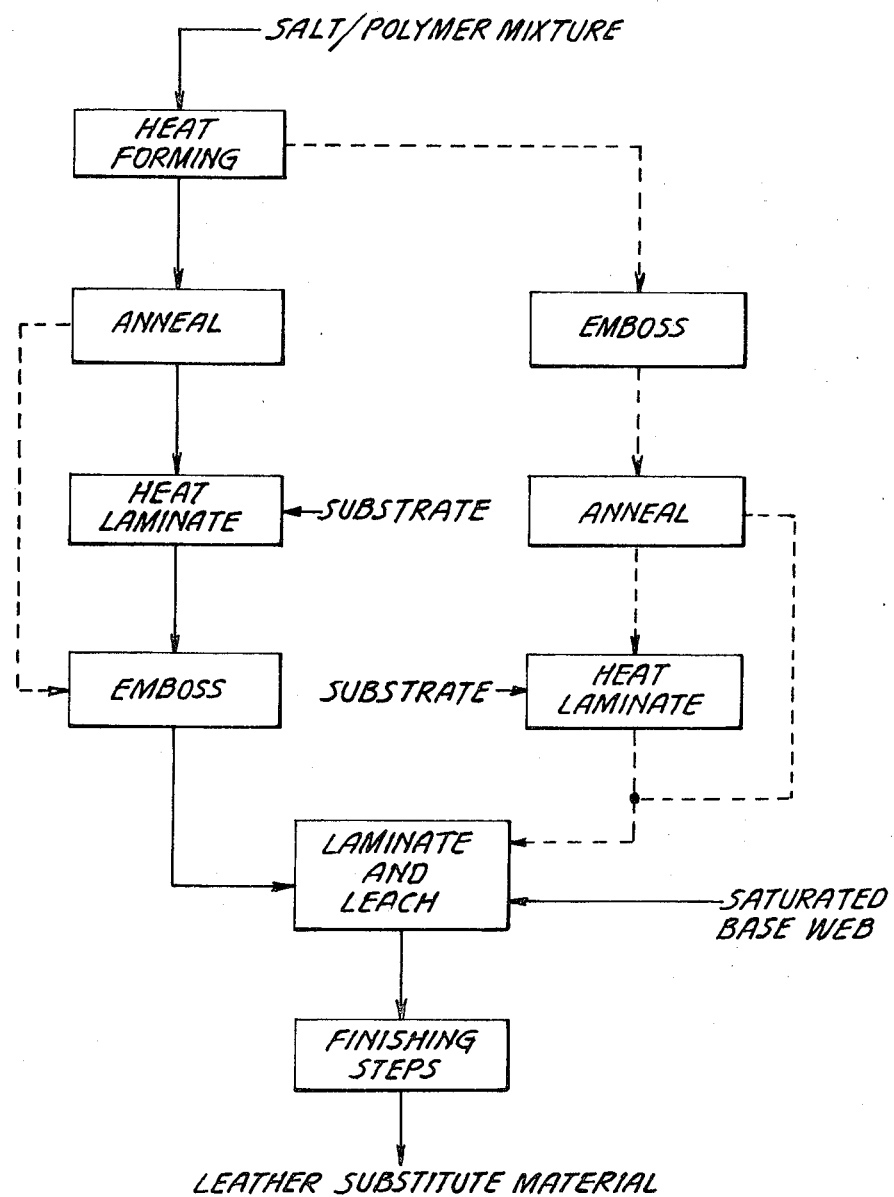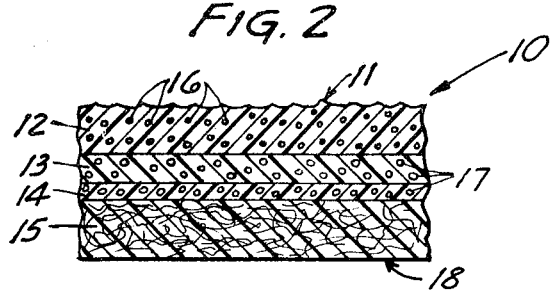

MICROPOROUS PRODUCTS

FIELD OF THE INVENTION

This invention relates to leatherlike microporous films and methods for making them. An aspect of this invention is that the disclosed leatherlike films are suitable for use in quality men's shoe upper material. A further aspect of this invention is that the salt-leach technique of introducing microporosity into a polymeric film is adapted for use with heat-formed (extruded, calendered, or pressed) polyurethane films.

DESCRIPTION OF THE PRIOR ART

Several methods are well known for their ability to produce leatherlike films from polyvinyl chloride, polyurethanes, and other synthetic organic polymers. Since a nonporous film of synthetic polymer does not transmit moisture effectively, it is essential—particularly when making a leather substitute to be used in high-quality men's shoes—to introduce porosity (especially microporosity) in some manner. Unfortunately, increasing the moisture vapor transmission (M.V.T.) of a synthetic polymeric film by increasing its porosity often degrades its other physical properties, e.g., scuff or abrasion resistance, tensile strength, physical appearance or feel. The term "microporous" is generally understood to refer to pores which are invisible to the naked eye, i.e., less than about 30 microns in their widest dimension. Pores 30–100 microns in diameter or width are very difficult to see, but are not generally considered microscopic, because they often affect the appearance of the surface of the film even if individual pores cannot be clearly distinguished.

Methods commonly used to provide microporosity are:

1. The solvent/nonsolvent technique: In this method a polyurethane "solution" (which may, in fact, be a highly solvated dispersion) is at least partially gelled with a nonsolvent for the polymer; a film containing entrapped solvent is cast from the gelled solution; and the entrapped solvent is washed out of the film with nonsolvent. This method is suitable for use with linear polyurethanes only. See, for example, Holden, U.S. Pat. No. 3,100,721, issued Aug. 13, 1963.

2. The water-laid sheet technique: In this method a polymer dispersion or latex is waterlaid in accordance with papermaking technology. The resulting sheet is carefully pressed and/or heated to an integral, porous film; see, for example, Raymond et al., U.S. Pat. No. 3,436,303, issued Apr. 1, 1969.

3. The high-boiling organic liquid droplet technique: In this method a polymeric latex containing suspended droplets of a high-boiling organic liquid such as mineral spirits is cast to form a film, dried (i.e., water is removed), and heated to drive off the organic liquid. See Newton, U.S. Pat. No. 3,445,272, issued May 20, 1969.

4. The foaming technique: In this method the polymeric film is made porous by means of a discontinuous gas phase which escapes from the surface of the film, in some processes before the film has been fully cured or hardened. See, for example, British Pat. specification No. 727,321, published Mar. 30, 1955.

5. The crushable filler technique: In this method the film is formed with a filler in it which is crushable. The film is passed through pressure rolls and the fracturing of the filler particles leaves voids in the material; see Dosmann, U.S. Pat. No. 3,143,436, issued Aug. 4, 1964.

6. The leachable solid filler technique: In this method an integral polymeric layer (an uncured liquid, a coating of polymeric solution, or a heat-formed film) containing a water-soluble filler such as finely divided sodium chloride is leached out with water. The water removes the filler, leaving voids in the layer; see, for example, the aforementioned British Pat. No. 727,321, British Pat. Nos. 727,679, 844,801, and 1,132,594, U.S. Pat. Nos. 2,819,981, 2,835,607, 3,387,989, etc.

Most of the above techniques either sacrifice the other previously mentioned physical properties or present quality control problems—the size, amount, shape, and distribution of the pores cannot be precisely controlled without a great deal of sophisticated know-how and, in some cases, cannot be adequately controlled at all. Other problems include "mud cracking," curling, and uncontrolled variations in the caliper of the film. For example, in the solvent/nonsolvent technique described in the Holden patent, the polymeric "solution" must be brought, by means of the addition of nonsolvent, to the point where it has become a true colloidal dispersion prior to the casting and washing steps. The addition of nonsolvent must be within very narrow limits, or else premature gelation can occur. Furthermore, even when the film is correctly cast and coagulated, it cannot take heavy embossing without loss of M.V.T.

The leachable solid filler technique, on the other hand, can be relatively easy to control, particularly when the polymeric layer is an integral solid sheet material which has been heat formed (extruded, pressed, or calendered) from a polymeric composition including the filler, and the filler thereafter leached out. These steps permit size, shape, and distribution of the pores in the heat-formed sheet to be controlled in a simple manner. The caliper (gauge or thickness) of the heat-formed sheet is under direct, positive control, and the properties of the polymer used in the film can be determined in advance by the simple expedient of selecting an already-formed polymer, no curing or in situ polymerization steps being involved.

Good M.V.T. values have been obtained when a coating is cast from a polyurethane solution containing sodium chloride and the sodium chloride is leached from the coating; but, uneven caliper, curling, and mud-cracking problems can result during processing of the cast film, particularly when it is cast to a dry thickness of about 5 mils (125 microns) or more.

A better way to achieve good M.V.T. values is set out in British Pat. Nos. 727,679 and 844,801, which disclose (1) mixing dry, particulate polyvinyl chloride (hereinafter P.V.C.) or natural rubber with NaCl powder, plasticizer, and solvent, (2) extruding the mixture to form a film, (3) removing the solvent, and (4) leaching the salt-filled film with water. Caliper can be controlled, and there is freedom from both curling and mud cracking. Thus, the aforementioned British technique appears to be an attractive prospect for adaption to other polymers besides P.V.C. and natural rubber, e.g., for polyurethanes. Experience shows, however, that there is no straightforward way of substituting a polyurethane starting material in the processes of British Patent Nos. 727,679 and 844,801. Polyurethane films are not commonly formed by extrusion, and it is difficult to predict the effect of processing steps, solvents, plasticizers, other processing aids, etc., upon such properties as flex life and scuff resistance in the final product. Unlike the typical vinyl polymers, the polyurethanes employed in making leather substitutes usually possess considerable inherent plasticity and elasticity. One could thus not predict that there would be any advantage to incorporating processing aids and plasticizers. Although the use of solvents in P.V.C. systems is optional, eliminating solvent from a heat-processed polyurethane system might be expected to necessitate fairly severe processing conditions. Furthermore, with or without processing aids or solvents, it might be supposed that the heat-forming step itself would have to be carried out uncomfortably close to the degradation temperature of the polyurethane, further complicating the predictability of results.

To sum up, it appears that the present state of the art shows a total lack of guidelines for adapting the leachable solid filler technique to a process utilizing a heat-formed (extruded, calendered, or pressed) inorganic salt-loaded polyurethane film, at least in terms of providing adequate M.V.T., scuff resistance, etc. Adequate M.V.T. can be obtained by casting a salt-loaded film from a polyurethane solution, but the advantages of positive control over caliper, elimination of mud cracking and curling and the like are then lost, particularly when films of at least 5-mil dried thickness are desired. The M.V.T. can, in any leachable filler method, be increased by increasing the filler loadings, but the scuff resistance and the flex-fatigue resistance of the resulting microporous film is thereby reduced. Any worthwhile leachable filler method must provide high M.V.T. without unduly high filler loadings.

Good M.V.T., scuff resistance, etc., is not always required of a leather substitute, but in the quality (medium-to-high priced) men's shoe market, the standards of consumer acceptability are very exacting. Indeed, no leather substitute, regardless of how it is made, has fully and consistently met all the exacting criteria of this market, and customer acceptance of Oxford-type shoes made from the available leather substitutes has generally lagged behind the expectations and hopes of the synthetic leather and shoe industries. This fact is readily grasped when M.V.T. alone is considered: given a relative humidity difference of 50 to 100 percent on opposite surfaces of the material and a temperature of 73° F. (23° C.), the better grades of natural leather have M.V.T. values ranging from 2,500 to 4,000 g./hr./100 m.$^2$, but most commercially available imitation leather materials with even moderately good leatherlike properties have an M.V.T. below 2,000 gm./hr./100 m.$^2$.

Accordingly, this invention seeks to provide a leatherlike sheet material with high M.V.T., good scuff resistance, good flex-fatigue resistance, high tensile strength, leatherlike appearance and tactile qualities, and controlled thickness, without the problems of solvent handling.

This invention also contemplates a method of making a leatherlike microporous sheet which will not develop mud cracking or curling during processing.

This invention further contemplates adapting the solid filler leach technique for use with a polyurethane starting material such that none of the aforementioned properties or qualities are sacrificed and such that the leach time is not unduly lengthy.

This invention further contemplates providing a method of producing a heat-formed microporous polyurethane film wherein the size, amount, and distribution of the pores can be controlled simply and with great consistency.

This invention further contemplates a method for improving the M.V.T. of polyurethane films without sacrificing any other leatherlike quality.

It is still further contemplated that the polyurethane used in the process of this invention need not be linear, but may contain some cross-linking.

BRIEF DESCRIPTION OF THE INVENTION

It has been discovered that inorganic salt-filled polyurethane films which have been heat formed (extruded, calendered, or pressed) from a particulate mass can be leached with a solvent for the inorganic salt to obtain a microporous polyurethane film of any desired thickness, e.g., 5–30 mils, with good M.V.T. and other leatherlike properties, provided that: (all properties being measured at 23° C.)

First, the polyurethane starting material or materials (preferably blended with a processing aid) are capable of forming a film with a storage shear modulus (G') of about 0.4 to about $5 \times 10^8$ dynes/cm.$^2$ and a loss tangent (loss tan.) of less than 0.5 measured at a frequency of 0.2 cycle/sec. and 23° C.

Second, the heat-formed polyurethane film filled with the particulate, leachable filler is heat treated at a temperature which is high enough to relieve stresses in the film, but not so high as to cause degradation of the polyurethane. In short, at some time after the heat-formation of the filled polyurethane film, the film is annealed.

At a suitable time following the annealing step, the filler is leached from the film, and the resulting microporous structure has excellent M.V.T. Other steps can be included in the process of this invention; for example, an embossing step can either precede or follow the annealing step. It is preferable to emboss the film prior to leaching, so that either light or heavy embossing can be carried out without substantially affecting the M.V.T. value. Other optional steps include lamination of the heat-formed, annealed film to any suitable substrate and various dyeing and finishing steps which further improve the appearance and/or leatherlike qualities of the film. Various mixing steps can be used to provide a filler/polyurethane composition prior to heat forming. The heat-forming and annealing steps, particularly if heat-forming is by pressing, can be carried out in a single equipment module. Regardless of the nature of the heat-forming step, however, it must be completed prior to the initiation of the annealing step.

The term "polyurethane," as used herein, denotes the materials commonly referred to by polymer chemists as "-polyurethanes," including polyurethane-polyureas, polythiourethanes, and certain of the polyureas. This class of polymers has molecular chains containing at least one polyoxyalkylene and/or polyester component derived from active hydrogen-terminated compounds (such as polyester or polyoxyalkylene glycols), at least one component derived from an aromatic or an aliphatic poly(usually di- or tri-) isocyanate, and, optionally, a component derived from an active hydrogen-containing compound which extends, cross-links or terminates the polymer chain. A wide variety of available polyurethanes, both linear and cross-linked will satisfy the requirements of this invention; provided, that a particulate mass of the polyurethane can be heat formed into a film with the above mentioned storage shear modulus and loss tangent properties, particularly when a suitable processing aid is used to facilitate heat forming. In the case of cross-linked polyurethanes, the cross-link density should be very low to facilitate the heat-forming step, a typically suitable cross-link density being less than one cross-link per 50,000 polymer atomic weight units. It should also be borne in mind that, even in some so-called "linear" polyurethanes, there can be some cross-linking due to the formation of biuret or allophanate linkages. Linear polyurethanes having repeating units of the formula -O-Z$^1$-O-CO-NH-Ar-NH-CO-O-Z$^2$-O-CO-NH-Ar-NH-COare preferred, Z$^1$ being a polyoxyalkylene or polyester chain, and Z$^2$ being a polyoxyalkylene or polyester chain or an alkylene radical having two to six (preferably four) carbon atoms. Ar is a mono or polynuclear aromatic group. Suitable mononuclear aromatic groups are benzene, toluene, xylene, and other substituted phenyl groups, while suitable polynuclear aromatic groups may have either fused or separate rings, e.g., naphthalene, biphenyl, diphenyl methane, and the like.

The term "processing aid," as used herein, refers to a class of materials which can be used in polymeric systems to facilitate extrusion, calendering, or similar processing steps. Preferred processing aids are the epoxides of the unsaturated fatty acid glyceryl esters, described in detail hereinafter. A plasticizer such as a diester of a low molecular weight polyoxyalkylene glycol can optionally be included in the starting material along with the processing aid.

The invention can be readily visualized from the drawings, wherein:

FIG. 1 is a flow diagram of a preferred process for making microporous films and laminating them with a suitable base web, and FIG. 2 is a cross-sectional view of a preferred form of leather substitute material made according to this invention.

DETAILED DESCRIPTION AND EXAMPLES

The discovery that annealing of a heat-formed, inorganic salt-filled polyurethane film permits the attainment of high M.V.T. upon leaching of the film to form a microporous structure is surprising, and has no simple theoretical explanation. It is well recognized that extrusion or calendering (and even pressing) of a particulate polymeric mass can introduce strains into the resulting polymeric film. It is also well known that heat tends to disorient the molecules of the film, thereby relieving patterns of strain. However, it is believed that it has not heretofore been recognized that relieving the strain in a salt-filled polyurethane film would increase the M.V.T. capabilities of the microporous film obtained by leaching out the filler.

Three possible reasons why this relationship between annealing and M.V.T. has not hitherto been perceived are: First, microscopic comparison of the annealed and unannealed films shows no obvious differences. Second, careful density comparisons reveal no measurable differences in void volume. Third, other means of eliminating strain (e.g., by reducing the stresses applied during the heat-forming step) do not provide the advantages of annealing.

Since annealing does not increase the void volume nor alter the microporous structure, at least in a manner which can be detected by microscopic or density studies, the explanation for the improved M.V.T. must be found elsewhere. Although this invention is not limited by any theory, it is theorized that the annealing step helps to preserve intercommunication or interconnection between the pores of the microporous film, even though such interconnection is not readily visible in microscopic studies. When two microporous films, identically processed except for the use of the annealing step of this invention with one of the films, are tested for porosity using the mercury porosimeter method (a test method wherein mercury is forced into the pores under pressure), some slight differences do appear. Even the porosimeter studies, however, do not suggest that a substantial increase in M.V.T. can be obtained by annealing. In actual practice, annealing according to this invention can double the M.V.T.; this surprisingly large increase in M.V.T. represents an improvement which can spell the difference between a leather substitute which will be at least potentially competitive with a good grade of natural leather and one which will not, particularly in the medium-to-high-priced men's shoe market.

In other words, the relief of strain patterns in the polymeric film is not the main reason for this annealing step. Strain patterns can be avoided by using plasticizers which permit low-stress extruding or calendering. The resulting strain-free films do not necessarily provide significantly improved M.V.T. after leaching, however.

Another advantage resulting from the annealing step is that the time required to leach the soluble filler is substantially reduced. In view of the negligible change in void volume and (apparently) pore structure attributable to annealing, this reduced leach time feature is equally difficult to explain. Perhaps the increased M.V.T. and reduced leach time are related phenomena. In any event, the economic burden of a long leach time has been reduced by my invention, thus bolstering the commercial feasibility of making heat-formed, microporous polyurethane films with the salt-leach technique.

There is also no simple explanation for the fact that my preferred processing aids improve or preserve the M.V.T. of the final product. Although this invention is not limited by any particular theory, this improvement may be related to the fact that the processing aid facilitates heat forming and/or to the possibility that it inhibits heat and/or oxidative degradation of the polyurethane film during processing.

It has been found that the presence of olefinic and epoxy (oxirane) functional groups in the molecules of the processing aid are desirable; hence, the aforementioned preference for processing aids comprising an epoxidized ester-type oil, i.e., an epoxidized glyceryl ester of a fatty acid which can contain unsaturation.

Epoxidized soybean oil has previously been used to plasticize P.V.C., and this epoxide is "compatible" with P.V.C. in virtually all proportions. ("Compatibility" is a term of art meaning ease of blending, and "compatible" plasticizers tend to be soluble in, form a single phase with, and/or exert a solvating effect upon at least a portion of the molecular structure of the polymer to be plasticized.) "Incompatibility" is generally considered undesirable in the P.V.C. art, since exudation of the plasticizer and tackiness of the polymer are considered undesirable.

In the present invention, however, the teachings of the plasticized P.V.C. art do not appear to be directly applicable. The partial incompatibility of the herein preferred processing aids appears to do no harm and may even contribute to their facilitation of the processing and the improvement or preservation of M.V.T. At least one type of compatible material, the water soluble polyoxyalkylene glycols, appears to be totally unsuitable, both as a processing aid and as a plasticizer. Other compatible materials such as the diesters of the polyoxyalkylene glycols are suitable as plasticizers (they are considered "secondary" plasticizers in the P.V.C. art), but are not particularly helpful in improving M.V.T. It has been found generally preferable to use the polyoxyalkylene glycol diester type plasticizer when the starting material contains a polyester urethane.

The preferred practice of the method of this invention is as follows:

I. Formulating the Starting Material

A suitable polyurethane, i.e., one which will provide a film with a storage shear modulus of $4 \times 10^7$ to $5 \times 10^8$ dynes/cm.$^2$ and a loss tangent value of less than 0.5, determined at a frequency of 0.2 cycle/sec. and a temperature of 23° C., is combined with a suitable solid filler and, preferably, a suitable processing aid. A plasticizer can be included if desired. The resulting solid filler loading should be about 30 to about 60 percent, preferably 40–50 percent, by volume (by weight, the range of loading in parts of NaCl per hundred of polyurethane, i.e., phr., is about 125 to about 250 phr.). The processing aid is added in the amount of about 1 to about 10 parts per hundred of polyurethane, preferably about 3–8 phr. The plasticizer is added in the amount of about 1–20, preferably 5–15, phr. Suitable processing aids, plasticizers, and polyurethanes are described in detail subsequently.

The preferred fillers are leachable with water or aqueous media such as water containing a detergent. An example of such a filler is a finely divided inorganic salt. Typical inorganic salts are the sulfates or chlorides of potassium or sodium. Sodium chloride is fully operative in this invention and has obvious economic advantages, but generally speaking, any water-soluble material which remains solid and does not become degraded or enter into side reactions with the polyurethane at temperatures up to about 250° C. is suitable. The preparation of the film-forming mixture involves conventional steps and need not be described in detail. The filler should be pulverized to the point where it will consist of particles less than about 30 microns in size. Salt particles with an average longest dimension larger than 30 microns are useful in this invention, e.g., for intermediate layers; but for the top layer of a shoe upper material, 1–30 micron-size pores, and hence 1–30 micron salt particles, are preferable. In fact, salt particles smaller than 15 microns in size, especially those having an average longest dimension of about 5 microns, are preferred.

Although any suitable conventional process can be used to provide the starting material for the process of this invention, a preferred formulation method is as follows: Sodium chloride is blended with a small amount (e.g., 1–3 phr.) of anticaking agent. Suitable anticaking agents are salts of organic acids, particularly calcium stearate. The sodium chloride is pulverized to provide particles having an average size of less than 30 microns. These particles are then milled with small pellets of a suitable solid polyurethane elastomer and the processing aid and, if desired, the plasticizer. The milled salt-polyurethane composition is then ground and fed to a press, a set of calender rolls, or an extruder.

II. Heat Forming

An integral, salt-filled polyurethane film is formed from the starting material produced in step (I) by pressing, calendering, or extruding. The result is a smooth sheet material. The term "film" is used because, in this art, it frequently distinguishes preformed layers from coatings deposited on substrates. For example, "coatings" can be cast, knife coated, or sprayed from a liquid medium onto an adhering or nonadhering substrate. It should be noted, however, that the term "topcoat" is sometimes used in this art to denote the outermost layer of a shoe upper material regardless of whether this layer is a "film" or a "coating." To be consistent, the term "film" is used herein to denote an integral sheetlike material which can be bonded to, but which is formed separately from, a substrate.

III. Annealing

As pointed out previously, the heat-formed film is heat treated long enough and at a high enough temperature to relieve stress but not so long or at so high a temperature that degradation of the film results. Polarized light inspection of a transparent, salt-loaded polyurethane film before and after heat treatments conducted according to this invention shows definitely that the heat-treated film has been relieved of stresses. Hence, "annealing" is considered a suitable descriptive term for this heat treatment step. Suitable annealing temperatures vary with the type of polyurethane used. For the polyurethane materials suitable for use in this invention, ambient temperatures below about 250° F. (about 120° C.) are very inefficient insofar as relieving stress is concerned. Temperatures above 120° C. are therefore preferable, since relief of stresses can definitely occur, and the annealing will in fact be substantially complete, for the purposes of this invention, in an hour or less. To reduce the annealing time to a minimum, ambient temperatures up to about 500° F. (260° C.) can be used. Temperatures above 260° C. rapidly degrade most polyurethane-containing materials. The degradation can be quite serious if the duration of such high-temperature heating lasts for as little as several seconds. At 260° C. and below, however, little degradation is likely to occur if the heating lasts only seconds, particularly with polyester urethanes. In short, the preferred annealing range is about 250°–500° F., and the preferred time is about 5 seconds—60 minutes. In the case of the preferred polyesterurethane starting materials, optimum annealing conditions are 350°–425° F. (180°–220° C.) for 1–10 minutes. Preferably no pressure is applied to the film during the annealing step, only heat, although slight pressure less than about 10 p.s.i. is not detrimental. Ordinarily the film to be annealed is merely laid on a nonadherent support around which hot air is circulated or over which radiant heaters are placed. If the unannealed film is heat formed by pressing, and annealing is performed in the same equipment module, the pressure should be at least partially relieved during the annealing step. In any event, heat forming must be complete prior to annealing.

IV. Embossing

The leatherlike appearance of a microporous film made according to this invention is substantially enhanced by various embossing techniques. Although the embossing step preferably follows the annealing step and precedes the leaching step, described hereinafter, embossing can be carried out at any suitable point in the process of my invention. For example, embossing can precede the annealing step, particularly when the preservation of fine detail in the embossed surface is not important. Embossing can follow the leaching step if preservation of M.V.T. is not important; obviously this latter alternative is not preferable for the preparation of men's shoe upper material. It is within the scope of this invention to carry out the embossing operation either simultaneously and/or in the same equipment module with other steps of the process of this invention, e.g., heat laminating. The annealing step can likewise be carried out in the same equipment module as the embossing step, but, for maximum annealing, not at the same time, due to the differences in conditions between the two steps.

The embossing conditions are preferably tailored to facilitate processing of the film and to preserve its leatherlike properties (M.V.T., flex life, scuff resistance, etc.).

A preferred method of embossing is to use a platelike member or a roll with a pattern thereon which resembles natural leather. The plate or roll is pressed against the surface of the salt-filled film in the desired temperature and pressure ranges to achieve accurate replication. Needless to say, it is within the scope of this invention to emboss the film such that it will have any desired grain or a smooth surface capable of taking a high polish. The exact character of the embossing, so long as it does not interfere with the aforementioned leatherlike properties, is a matter of choice for the skilled artisan.

When plate embossing is used, the peak temperature obtained during the course of the embossing period (which preferably lasts 5 to 30 minutes) is up to about 300° or 350° F. (about 150° or 180° C.). Pressures as low as 10–16 p.s.i. provide good detail. When continuous roll embossing is used, the temperatures are somewhat similar but the available time is less. (The pressure is applied only while the film is in the nip.)

V. Leaching

The finely divided filler, as pointed out previously, is preferably a water-soluble inorganic salt such as the chloride or sulfate of a suitable metal, e.g., sodium or potassium. For economic reasons and for its inertness toward polyurethanes, water is the preferred solvent used in this leaching step, with or without the addition of detergents. The solvent can be at any suitable temperature. Elevated temperatures (e.g., 25°–100° C.) can reduce the leach time. The solvent can be partly be employed in the gas phase, e.g., as steam/water mixtures.

The void volume obtained by leaching is essentially determined by the volume percent of filler in the salt-loaded film. The previously mentioned filler loadings provide a leached film with a good M.V.T., good scuff resistance, and a long flex life.

Although any polyurethane which meets the G' and loss tangent requirement of this invention can be used, it is preferred to use substantially linear polymers containing -NH-R-NH-CO- and -X-$Z^1$-X-CO- units, and -X-$Z^2$-X-CO- units in the polymer chain, wherein R is an aliphatic or aromatic group (e.g., Ar, as defined previously); X is O, S, NH, N-aliphatic, or the like; $Z^1$ is a polyoxyalkylene or polyester chain; and $Z^2$ is a divalent aliphatic or aromatic radical. Although these units are shown as divalent structures, it should be understood that, if a cross-linked polyurethane is desired, the "$Z^1$," "$Z^2$" or "R" groups would have one or more additional substituents. The $Z^2$ radical is derived from a compound having the formula $Z^2(XH)_m$, wherein $Z^2$ and X are as defined previously, m is 1–5, preferably 2 or 3, and H is an "active hydrogen" as defined in the Zerwitinoff test, J. Amer. Chem. Soc. 49, 3181 (1927). In the preferred polyurethanes, X is O and R is Ar, as defined previously. If the $Z^1$ chains in the molecule are not the same, i.e., the polymer contains more than one kind of polyoxyalkylene and/or polyester chain, at least one $z^1$ chain preferably has a molecular weight of at least about 400 but less than about 3,000.

When $Z^1$ is a polyester chain, the polyester units are preferably of the repeating formula -O-$A^1$-O-CO-$A^2$-CO-, wherein $A^1$ and $A^2$ are divalent aliphatic groups such as alkylene radicals. These polyester units are derived from the interaction of a bifunctional initiator with one or more lactones, for example, as described in U.S. Pat. No. 2,933,477, or by an esterification or ester-interchange reaction involving a dicarboxylic acid or anhydride or ester thereof with an alkylene polyol, preferably an alkylene glycol. The bifunctional initiators referred to previously are compounds having two reactive sites capable, with or without the aid of a catalyst, of opening a lactone ring and forming an open chain of repeating ester units. Examples of useful initiators include the lower alkylene glycols (e.g., ethylene glycol, propylene glycol), alkanol amines such as ethanol amine, and alkylene diamines. Suitable lactones include the omega-$C_5$–$C_8$ lactones, e.g., epsilon-caprolactone, epsilon-methyl-epsilon-caprolactones, and zeta-enantholactone. Especially suitable polyester chains in the 300–3,000 molecular weight (preferably 800–1,200) range can be obtained from epsilon-caprolactone and ethylene glycol.

When polyesters are prepared from dicarboxylic acids, anhydrides, or esters, and alkylene glycols, the preferred acid, anhydride, or ester, can be selected from a wide variety of polybasic (preferably dibasic) acids. To facilitate extrusion of the ultimate polyurethane, it is preferred to use the dibasic fatty acids, i.e., HOOC—$(CH_2)_n$—COOH, wherein n is a small integer, e.g., 1–8. Particularly suitable dibasic acids are malonic, succinic, and adipic. Examples of useful alkylene polyols are ethylene glycol; 1,3-propane-diol; 1,4-butane diol, and the like. Especially good results are obtained when the polyester chain contains 1,4-butylene adipate units.

The preferred polyurethanes of this invention are prepared by mixing a molten hydroxyl terminated polyester or polyether and a molten arylene diisocyanate with a small amount of alkylene glycol; see, e.g., U.S. Pat. 2,871,218. The resulting reaction, particularly when a polyester glycol is the polymeric glycol reactant, is fairly rapid, and a catalyst is not generally required. Alternatively, known techniques involving the use of a prepolymer can be used. In those instances where a catalyst can be helpful, particularly when a polyetherglycol (e.g., polytetramethylene ether glycol, polypropylene glycol, etc.) is the coreactant, any suitable prior art catalyst can be used. The use of hydroxyl-terminated polyesters as opposed to carboxyl-terminated polyesters is preferred because of the difficulties attendant upon carbon dioxide formation which would result from an NCO/COOH reaction. The use of polyesters and/or polyethers containing saturated rather than olefinic radicals is preferred in order to avoid the presence of unwanted sites for cross-linking.

It is permissible to modify the stiffness of the polymer by including in the polyurethane-forming reaction other chain-extending, chain-branching, or chain-terminating agents, e.g., arylene diamine chain extenders. Preferred chain-branching agents are the triols and triamines commonly used in the polyurethane art. Various monoamines and monohydroxy compounds are known in the art for use as chain-terminators. Chain propogation can be carried out in any suitable manner known in the art, e.g., including these hydroxyl- or amine-containing compounds in a "one shot" mixture (generally along with a catalyst) or interacting the chain extenders with a suitable prepolymer. Since the polyurethane films of this invention are made by a heat-forming step, the more heat-resistant polyurethanes are preferred. A good heat-resistant polyester urethane which also provides films with good G' and loss tangent measurements is derived from a reaction mixture comprising hydroxy-terminated poly(1,4-butylene adipate), 1,4-butane diol, and diphenyl methane-p,p'-diisocyanate.

Suitable commercially available polyurethanes are available from B. F. Goodrich Chemical Co. under the trade names "Estane" 5701-F1 and 5707-F1 (polyester urethanes) and "Estane" 5714 (a polyetherurethane).

Although the polyester urethanes are easier to use in this process in some respects, they may lack the desirable low-temperature flex properties of the polyetherurethanes. It is, however, possible to improve the low-temperature properties of the polyester urethanes by blending them with a plasticizer which will not detract from other desirable properties, e.g., the M.V.T. of a microporous film, the scuff resistance, etc. It is difficult to predict such undesirable side effects. It has been found that diesters of polyoxyalkylene glycols which are substantially water-insoluble appear to meet the exacting criteria of this invention. Examples of such plasticizers are poly(ethylene glycol)-di-alkanoates such as tetraethylene glycol di(2-ethylhexanoate), available from Union Carbide Corp. of New York, N.Y. as "Flexol 4GO." This plasticizer is not a substitute for the "processing aid" of the invention, however. It is preferable to use at least 3 parts per hundred parts (by wt.) polyurethane of the processing aid even if the plasticizer is included in amounts up to about 20 parts per hundred.

The preferred class of processing aids are the epoxides of fatty oils (glyceryl esters of long-chain carboxylic acids), the fatty oils preferably being the unsaturated type. Suitable fatty oils are obtained from vegetable sources known as the "linolenic acid group," since these sources (soybean, candlenut, linseed, hemp or grapefruit or orange seed, English walnut, wheat germ, etc.,) provide glyceryl esters of a group of fatty acids which includes a significant amount (e.g., 9 percent or more) of linolenic acid, a triolefinic $C_{18}$ carboxylic acid. The formula for these fatty oils is:

wherein $R^1$, $R^2$, and $R^3$ are $C_6$–$C_{24}$, primarily $C_{12}$–$C_{18}$, saturated and unsaturated aliphatic radicals, particularly $C_{16}$ and $C_{18}$ alkenyl, alkadienyl, and alkatrienyl radicals. Epoxidation occurs at least one of the double bonds in these aliphatic radicals, thus providing, in the case of epoxidized soybean oil, a class of compounds in the 850–1,100 (calculated theoretical) molecular weight range which freeze at about 0°–10° C., have an iodine number ranging from about 0.6 to about 17, an acid number (mg. KOH/g.) ranging from about 0.1 to about 0.7, a hydroxyl number of about 15 to about 21, an epoxy equivalent weight (see Durbetaki, Analytical chemistry 28, 2000 [Dec., 1956]) of about 230 to about 280, and a saponification number (grams saponified by 1 L. of 1 N KOH) of about 305 to about 320. Rohm & Haas Company of Philadelphia, Pa. supplies epoxidized soybean oil under the trade mark "Paraplex" G-60, G-61, and G-62. "Paraplex G-62," which freezes at about 5° C., has an average molecular weight of about 1,040, an iodine number of about 0.8, an acid number of about 0.6, a hydroxyl number of about 20, and an epoxy equivalent weight of about 237 is generally preferred. "Paraplex G-62" has an elemental analysis of 71.3 percent C/10.4 percent H. The percent of oxirane oxygen is 6.75 percent. "Paraplex" G-60 and G-61 have somewhat similar molecular weights, elemental analyses, epoxy equivalent weights, characteristics, and freezing points; they also contain both epoxy groups and carbon-carbon double bonds.

A leatherlike shoe upper material suitable for use in making quality men's shoes can be made by incorporating the process steps of this invention in an overall synthetic leather manufacturing operation. An example of how this can be done is schematically illustrated in FIG. 1 of the drawing.

From FIG. 1, it can be seen that a salt/polymer mixture (an inorganic salt such as sodium chloride, pulverized to a size suitable for providing microporosity, milled with pellets of a suitable polyurethane polymer—several suitable polyurethanes can be made or purchased in, for example, dry pellet form) is fed to heat-forming equipment, such as a press or a set of calender rolls, or, alternatively, ground first and then extruded. Preferably extruding or calendering is used; the result in any event is a salt-loaded polyurethane film. The film can be first embossed and then annealed and, if desired, heat-laminated to a suitable substrate such as a woven (e.g., cotton) cloth and/or a second microporous or macroporous polymeric film. Preferably the heat-formed film is annealed, heat-laminated to the substrate, and embossed to provide a film having a leatherlike surface. The brackets of FIG. 1 indicate that the annealing, heat-laminating, and embossing steps can be combined in various ways. for example, the annealed film can be "lam-bossed" to a substrate. If the aforementioned woven or film substrate or substrates are omitted, the heat lamination step is, of course, omitted. If one or more film substrates are used along with or in lieu of a cloth substrate, the interposed films must be porous but need not be free of visible (<30 micron-size) pores, since it is covered up by the topmost, heat-formed, salt-loaded film. In fact, a substrate or interlayer (interposed) film having at least some 30–200 (preferably greater than 40) micron-size pores is preferred. This interlayer or substrate film can be provided in salt-loaded form and can be leached along with the top film; its composition can be similar to that of the top film, except that the salt loading can be much higher, since the interlayer will not suffer abrasion. The use of more and/or grosser pores in the interlayer appears to contribute to a more leatherlike "break" in the composite final product, and also helps to reduce the tendency to delaminate during flexing of the composite product.

As is well known in the art, it is frequently desirable to superpose a leatherlike film upon a nonwoven fabric substrate to provide a material with "flesh" and "grain" surfaces. See, for example, example 8 of U.S. Pat. No. 2,723,935. Webs or batts particularly suitable for use in this invention are random-laid, fibrous, sheetlike fabrics wherein the fibers are synthetic and are derived from organic polymers such as the polyamides, the polyesters, the polyolefins, the vinyl polymers, and the like. Natural fibers such as cotton are less preferred. The webs or batts can be needle punched and/or shrunken with heat to provide a dense, compact fibrous structure which can be impregnated with a polymeric binder. The binder can be a solution or latex of a polyurethane, a poly(butadiene-styrene), or the like. After the conventional drying and finishing steps, the compacted nonwoven web or batt is ready to be combined or laminated with the salt-filled polyurethane film which may be already bonded to a woven or porous film substrate. Various methods of bonding the web or batt to the film or film/substrate composite can be used, among them the use of an adhesive interlayer which will not interfere with moisture vapor transmission, e.g., a layer of macroporous and/or microporous polyurethane adhesive. Regardless of how the web or batt is combined with the salt-loaded film or film/substrate composite, the next step is leaching the salt from the film and from any other layer or layers which are also salt-loaded (e.g., a second salt-loaded film as described previously). The leaching step provides the microporosity essential for good M.V.T. (The web or batt substrate is a porous fabric structure and has no adverse effect upon M.V.T.) After a number of suitable finishing steps, including drying, dyeing, sanding, polishing, and the like, a leatherlike sheet material comprising a microporous film superposed upon the web or batt is obtained. The characteristics of this sheet material are described subsequently. This material is particularly suitable for use in making uppers for men's shoes in the medium-to-high price range.

The annealing step of this invention can be carried out using any convective or radiant heating means which will not introduce strains into the film, e.g., an oven heated by hot air or other gases, infrared energy, or the like. For economical operation, this annealing step, and all the other steps shown or described in this application can be arranged into a continuous process. In such an operation, the salt-loaded film is continuously extruded or calendered onto a nonadhering, moving carrier or support such as an endless belt. The film is then annealed by passing the carrier at a controlled speed through, for example, a hot air oven.

A preferred form of the aforementioned leatherlike sheet material of this invention is described in FIG. 2. The composite material 10 preferably comprises a top layer 12 containing only micropores 16 and having an exposed "grain" (preferably embossed) surface 11 and an M.V.T., prior to the final finishing steps of 3,000–4,500 g./hr./100 m.² at 100 percent/50 percent relative humidity (R.H.); a backup (interposed) interlayer 13 which can be a woven cloth or, in this case, an interposed polyester urethane film containing at least some macropores 17; a nonwoven web 15 to provide a "flesh" side 18 for the product; and an adhesive interlayer 14 or the like bonding the backup interlayer to the nonwoven web. The adhesive layer 14 must be porous and can also contain macropores 17. Additional layers (not shown) can be sandwiched between top layer 12 and nonwoven web 15, if desired. All M.V.T. determinations herein are at 23° C.

After the final finishing steps (including dyeing, polishing, etc.), the M.V.T. of a material such as that illustrated in FIG. 2 has decreased, but is still above 1,500 g./hr./100 m.² at 100 percent/50 percent relative humidity (R.H.). With optimum processing conditions and ingredients, an M.V.T. above 2,000 g./hr./100 m.², also at 100 percent/50 percent R.H., is obtained. The flex life of the finished product exceeds 250,000 flexes (e.g., cycles of a Bally Flexometer) at 23° C. The abrasion loss is quite small. With an H-22 wheel and a 1,000 gram weight, the Taber Abraser removes less than 0.07 gram from the top layer 12 after 200 cycles (about 3 minutes). In fact, the abrasion loss, under these same conditions, is less than 0.045 gram with the preferred products. If top layer 12 were delaminated and tested, its loss tangent would still be less than 0.5, preferably less than 0.2, measured at 0.2 cycle/sec. and 23° C. Its $G'$, however, would be lower—but still above about $10^7$ dynes/cm.². If the top layer were both delaminated and hot pressed to a nonporous film, its $G'$ would be brought substantially back to the starting material range, i.e., above about $4\times10^7$ dynes/cm.². The $G'$ and loss tangent values, both of starting materials and final products, are preferably determined on films containing by weight, 1–10 parts per hundred (phr.) of epoxidized soybean oil. The exclusion of 1–20 phr. tetraethylene glycol (2-ethyl hexanoate) affects the loss tangent and $G'$ values, but not substantially. The water leach step removes very little of either of these additives—both are substantially water insoluble.

The preferred polyurethane starting materials of this invention, when heat-formed to nonporous films containing the epoxidized soybean oil (e.g., "Paraplex" G-62), have the following properties: $G'$—0.5 to $2.5\times10^8$ dynes/cm.², and loss tangent—0.05 to 0.2, at 0.2 cycles/sec.; $G'$ and loss tangent taken at 23° C.

As pointed out previously, an important feature of this invention is the ability to directly control the thickness of the microporous film or films, the number, size, and distribution of the pores, and hence the void volume as well. The pores in the leached film will be substantially like the salt particles that were removed by leaching—in number, size, distribution, and even in shape. (Leaching out the face-centered cubic salt particles tends to leave behind pores which are roughly spherical or even roughly cubical in shape.) Thus, the void volume of films made microporous according to this invention ranges from about 30 to about 60 percent, preferably 40–50 percent.

The caliper (gauge or thickness) of these microporous films will not vary substantially over long lengths of film. The heat-forming step of this invention is preferably used to provide 5–30 mil. (125–750 micron) salt-loaded films. Any desired thickness of film can be made by this heat-forming step, and, unlike casting methods, making salt-loaded films greater than 5 mils (125 microns) in thickness and of uniform caliper poses no problem. Films of 3–5 mils (75–125 microns) thickness can also be heat-formed, but control of caliper is more difficult than with the thicker films. The upper limit of film thickness is dictated only by practical considerations of processing and fabricating. For example, films over 100 mils (2.5 mm.) thick could be made but would be less easy to work with than 3–100 mil films. Because careful milling of the salt and polymer results in a uniform distribution of a known amount of salt particles of known size in a polyurethane matrix, the number of pores per sq. mm. of film surface can be controlled in a manner exactly analogous to the manner of controlling the pore size, void volume, etc. With 5-micron salt particles, for example, there will be 15,000–30,000 pores/mm.², depending on the salt loading. It is preferred to provide more than 500 pores/mm.², but more than 100,000 pores/mm.² is not absolutely necessary for good M.V.T.

The principle and practice of this invention is illustrated in the following examples wherein all parts are by weight, unless otherwise specified.

EXAMPLE I

The following materials were compounded on a two-roll rubber mill:
  300 g. Polyester urethane pellets analyzed and found to have been derived from:
    1.00 mole poly(1,4-butylene adipate) glycol
    1.85 moles 1,4-butane diol
    2.85 moles diphenylmethane - p,p'-diisocyanate
    (These polymer pellets are available from B. F. Goodrich Chemical Co. under the trade designation "Estane 5707-F1.")
  480 g. Sodium chloride powder, average particle size ground to 5 microns (Available from Morton Salt Co. as "Culinox 999 Grade" in 300–400 micron-size particles.)
  480 g. Sodium chloride powder, average particle size ground to 5 microns (Available from Morton Salt Co. as "Culinox 999 Grade" in 300–400 micron-size particles.)
  15 g. Epoxidized soybean oil, average molecular weight 1,040, iodine number 0.81, 6.75 percent oxirane oxygen, epoxy equivalent weight 237.
    (Available from Rohm & Haas Co., Philadelphia, Pa. as "Paraplex G-62").
  5 g. Calcium stearate The particular polyesterurethane described above was selected because of its preferred $G'$ (about $2.2 \times 10^8$ dynes/cm.$^2$ at 23° C.) and loss tangent (about 0.1, determined at 23° C. and 0.2 cycle/sec.) properties.

The fine particle salt was prepared by ball milling in toluene in a porcelain ball mill for about 65 hours using ½ inch glass marbles. Compounding required about 8 minutes with a roll temperature of about 340° F. (about 171° C.). The batch was scraped off the roll, scored, and ground in a Sprout-Waldron cutter through a 3/16 inch screen to yield a granulated extruder feed having an average particle size of about ⅛ inch (3 mm.) diameter. Several batches were prepared and mixed together to form a large master feed batch.

Extrusion was conducted in a machine having a 1¾-inch barrel diameter, a 24:1 length-to-diameter ratio, and using a 14 inch (36 cm.) die (Johnson Mfg. Co.) and a screw with a 2.5:1 compression ratio. The screw had twelve flights in the feed section, three in the transition zone, and nine in the metering zone. Flight depth was 0.85 inch (2.2 mm.) in the metering section. The screw had a pointed tip and no screen pack was used. The film was extruded at a screw speed of 44 r.p.m. resulting in a power consumption of 200 watts. Maximum barrel temperature was 445° F. (230° C.) and die temperature was 400° F. (205° C.). The film was extruded into takeaway rolls consisting of a silicone rubber roll and a cold water cooled chrome roll. Nip pressure was 20 p.s.i. A second pair of rolls pulled the film at a rate of 5.5 ft./min., resulting in a film thickness of about 12 mils (about 300 microns) and a width of about 13 inches (33 cm.). Output of extrudate was about 40 lbs. (about 18 kg.) per hour.

A sheet of extruded film about 13 inches × 18 inches (33×46 cm.) was placed on silicone-treated paper and thermally treated by placing it in a large Despatch forced air oven for 2 minutes. The hot air in the oven was kept at about 400° F. (205° C.). Next, samples were cut from the annealed and from the unannealed film for measurement of properties. Both samples were leached free of NaCl with distilled water heated to 40° C. M.V.T. rate for the samples was measured as follows: A 4-ounce jar half filled with tap water and with a hole in the lid was used as the testing apparatus for each sample. A circular sample was die cut and placed in the lid of the jar providing the barrier between the water vapor in the jar and the water vapor in the air outside. The assembly was weighed on an automatic balance and then placed in a room maintained at a relative humidity of 50 percent and a temperature of 23° C. After 24 hours in the room the test assembly was weighed again to determine the weight loss. From the weight loss, the exposed sample area, and the test time, the M.V.T. rate was calculated. Four samples each of annealed and unannealed film (all having been leached free of the NaCl powder with 40° C. distilled water) were tested at the same time and the results were averaged. The following results were obtained:

| Sample | M.V.T. Rate (gms./hr./100 sq. meters) |
| --- | --- |
| Unannealed | 1,850 |
| Annealed | 3,800 |

Measurements were also made of the percent by volume of voids in both annealed and unannealed films. The procedure was as follows: A circular sample was cut with a die having a diameter of 4.57 cm. Thickness was measured at 6 points to 0.1 mil accuracy with an accurate micrometer. Sample volume was calculated. The sample weight was measured on an analytical balance and the sample density (i.e., apparent density) was calculated. Next the density of a film composition composed of 100 parts Estane 5707 F1, 5 parts "Paraplex G-62," and 1.5 parts calcium stearate was calculated by using the weighted value of the known density of each component. This density was 1.21 g./cc. and was the density of the microporous film material left after leaching out the salt. Next the void volume was calculated using the following derived equation:

$$\% \text{ voids by volume} = \frac{(1.21 - \text{sample density})}{1.21} \times 100$$

The theoretical void volume was determined from the calculated volume of salt leached out. The following results were obtained:

| | %Voids | |
| Sample | Measured | Theoretical |
| --- | --- | --- |
| Unannealed | 44.7% | 45.7% |
| Annealed | 44.7 | 45.7 |

Thin sections of both annealed and unannealed films were prepared by first imbedding small samples in an epoxy resin, freezing, and then cutting 5-micron sections with a microtome. The samples were examined under 500 magnification with a light microscope. Photographs were made of the structures and pictures were printed under a twofold enlargement resulting in a total magnification of 1,000 times for the structures. Clear, detailed pore structures were observed in each sample, with no differences discerned between the annealed and unannealed films.

The annealed film was pressed to a nonporous layer to determine its physical properties after processing, which were:
$G'$: $2.18 \times 10^8$ dynes/cm.$^2$
Loss Tangent: 0.10 These measurements indicate that the degradative effect of heat-forming (in this case extruding), annealing, and leaching upon the polyesterurethane was not very substantial.

EXAMPLE II

Three batches (A, B, and C) of extruder feed were prepared according to example I, but with 540 g. (180 phr.) of the salt. Further modifications were: In Batch A, 15 grams (5 phr.) of tetraethylene glycol di(2-ethylhexanoate) were included in the formulation; in Batch B, 30 grams (10 phr.) of this diester were included. In all other respects, the three batches were identical to the formulation of Example I.

The extruder used in this example had a constant flight depth of 250 mils (6.4 mm.) and a 2:1 compression ratio. The screw speed was 60 r.p.m., the power consumption was 300 watts, and the maximum barrel temperature was 430° F. (220° C.). The extrudate was very slightly drawn to provide 6 ft./min. of a 15 mil (375 micron) film. The films were annealed as in Example I, and were made into finished microporous leather substitutes in accordance with FIG. 1 of the drawing, a woven cloth substrate being used in the heat-laminating step, and distilled water at 40° C. being used in the leaching step. All three samples were compared as to flex life, determined on a Bally Flexometer at 0° F. (−18° C.) and 23° C. All three samples had about the same flex life at 23° C. (greater than 250,000 cycles), but the Batch A and Batch B samples had more than double the flex life of the Batch C sample at −18° C. The M.V.T. value for each of the finished samples was determined as in Example I, all samples having an M.V.T. of 2,200 g./hr./100 m.$^2$. The M.V.T. values of portions of the annealed, leached films, tested prior to any finishing steps and separate from the cloth backing and nonwoven base web, were all 3,700 g./hr./100 m.$^2$.

As the person skilled in the art will appreciate, many modifications of this invention are possible. For example, the microporous films are useful in women's shoe uppers, inexpensive men's shoe uppers, shoe soles and liners, rainwear, upholstery, fabrics, hospital sheeting, wound dressings, etc., as well as in quality men's shoe uppers, the preferred use.

Physical measurements mentioned throughout this disclosure were taken at 23° C. unless otherwise specified. Annealing temperatures refer to environmental (ambient) conditions, unless otherwise specified.

What is claimed is:
1. A microporous film having a void volume of about 30 to about 60 percent, having 500–100,000 pores per square millimeter of surface, being free of visible pores, and comprising:

a thermoplastic polyurethane resin having a loss tangent less than 0.5 determined at 0.2 cycle/sec. and 23° C. and a storage shear modulus at 23° C. of about $4 \times 10^7$ to about $5 \times 10^8$ dynes/cm.$^2$, and about 1 to about 10 parts, per hundred parts by weight of said polyurethane, of an epoxidized glyceryl ester of a $C_5$–$C_{24}$ carboxylic acid, said epoxidized glyceryl ester being blended with said polyurethane.

2. Film according to claim 1 wherein said microporous film is 3–100 mils in thickness, has a void volume of 40–50 percent, and has 15,000–30,000 pores/mm.$^2$, said pores measuring less than 15 microns in their largest dimension, and wherein said epoxidized glyceryl ester is epoxidized soybean oil.

3. Film according to claim 1 wherein said microporous film contains a plasticizing amount of a substantially water-insoluble diester of a polyethylene glycol.

4. Film according to claim 3 wherein said diester is tetraethylene glycol di(2-ethyl hexanoate).

5. Film according to claim 1 wherein said microporous film is included in a laminate and is laminated to a backup interlayer, and said interlayer is in adherent contact with a nonwoven web.

6. Laminate according to claim 5 wherein said laminate of said microporous film, said interlayer, and said web has an M.V.T., when exposed to a relative humidity of 100 percent on one side and 50 percent on the other side, greater than 2,000 g./hr./100 m.$^2$, and a flex life in excess of 250,000 cycles; and wherein said microporous film, tested independently of said laminate, has a storage shear modulus of at least $10^7$ dynes/cm.$^2$, said M.V.T., flex life, and storage shear modulus being measured at 23° C.

7. A laminar sheetlike leather substitute material, including, as laminae thereof, a microporous film and a nonwoven web, said microporous film having: a storage shear modulus greater than $10^7$ dynes/cm.$^2$; a void volume of about 30 to about 60 percent; a porosity of about 15,000 to about 30,000 pores/mm.$^2$ of surface, said pores being less than 15 microns in their widest dimension; and a thickness of 3–100 mils; said microporous film comprising:

a polyurethane having a loss tangent less than 0.2 determined at 0.2 cycle/sec. and 23° C. and a storage shear modulus at 23° C. of about $4 \times 10^7$ to about $5 \times 10^8$ dynes/cm.$^2$, and about 1 to about 10 parts, per 100 parts by weight of said polyurethane, of epoxidized soybean oil.

8. A porous polymeric film comprising:
1. a polyurethane containing (a) -NH-R-NH-CO- units, wherein R is selected from the group consisting of an aromatic and an aliphatic group, and (b) O-Z-O-CO- units, wherein Z is selected from the group consisting of a polyoxyalkylene and a polyester chain, and
2. a film-formation-facilitating amount of an epoxidized glyceryl ester of a $C_5$–$C_{24}$ carboxylic acid, said epoxidized glyceryl ester being blended with said polyurethane.

9. A porous polymeric film according to claim 8 wherein said film-formation-facilitating amount is about 1 to about 10 parts per 100 parts by weight of said polyurethane.

* * * * *

UNITED STATES PATENT OFFICE
CERTIFICATE OF CORRECTION

Patent No. 3,640,829                                Dated February 8, 1972

Inventor(s)   Robert L. Elton

It is certified that error appears in the above-identified patent and that said Letters Patent are hereby corrected as shown below:

Column 2, line 41, "adaption" should be -- adaptation -- .

Column 6, line 67, "preformed" should be -- pre-formed -- .

Column 12, lines 67-69, under EXAMPLE I, should be deleted. These three lines are a duplication or repeat of lines 64-66 just preceding.

Column 13, line 19, "0.85 inch" should be -- 0.085 inch -- .

Column 16, line 21 (in Claim 8), after "(b)" insert a hyphen, so that the formula reads -- -O-Z-O-CO- units, -- .

Signed and sealed this 8th day of May 1973.

(SEAL)
Attest:

EDWARD M. FLETCHER, JR.        ROBERT GOTTSCHALK
Attesting Officer              Commissioner of Patents